US009666329B2

(12) United States Patent
Li Pira et al.

(10) Patent No.: US 9,666,329 B2
(45) Date of Patent: May 30, 2017

(54) OIL-OIL BUSHING AND OIL TRANSFORMER

(71) Applicant: ABB Technology AG, Zurich (CH)

(72) Inventors: Isidoro Li Pira, Vettelschoss (DE); Ulrich Huhn, Bonn-Oberkassel (DE)

(73) Assignee: ABB Schweiz AG, Baden (CH)

( * ) Notice: Subject to any disclaimer, the term of this patent is extended or adjusted under 35 U.S.C. 154(b) by 240 days.

(21) Appl. No.: 14/665,689

(22) Filed: Mar. 23, 2015

(65) Prior Publication Data

US 2015/0279509 A1 Oct. 1, 2015

(30) Foreign Application Priority Data

Mar. 27, 2014 (EP) .................................... 14001129

(51) Int. Cl.
*H01B 7/32* (2006.01)
*H02G 15/20* (2006.01)
*H01B 3/20* (2006.01)
*H01F 27/04* (2006.01)
*H01F 27/12* (2006.01)

(52) U.S. Cl.
CPC ............... *H01B 3/20* (2013.01); *H01F 27/04* (2013.01); *H01F 27/12* (2013.01); *Y10T 16/063* (2015.01)

(58) Field of Classification Search
CPC .......... H02G 3/04; H02G 15/34; H01F 27/04; H01F 27/324; H01F 27/12; H01F 27/32; H01F 27/321; Y10T 16/063; H01B 3/20; H01B 3/00; H01B 17/42; H01B 17/32; H01B 7/32
USPC .... 174/650, 152 R, 152 G, 153 G, 652, 135, 174/142, 137 R, 151, 17 CT, 140 R, 174/11 BH, 15.1, 15.3; 439/587, 271, 439/272, 273, 274, 275; 16/2.1, 2.2; 361/600, 601, 679.01
See application file for complete search history.

(56) References Cited

U.S. PATENT DOCUMENTS 4,975,797 A * 12/1990 Veverka .................. H01F 27/04 361/127
5,214,240 A * 5/1993 McArdle ................ G01R 31/16 174/11 BH
6,888,060 B2 * 5/2005 Ashibe ................... H02G 15/34 174/15.3
7,939,752 B2 * 5/2011 Sjoberg .................. H01B 17/32 174/11 BH
7,964,799 B2 * 6/2011 Isberg ..................... H01F 27/04 16/2.1

(Continued)

*Primary Examiner* — Angel R Estrada
(74) *Attorney, Agent, or Firm* — Barnes & Thornburg LLP

(57) ABSTRACT

An oil-oil bushing is disclosed which can include a rotationally symmetrical, paraboloid-like, hollow bushing element of a solid insulating material, along the axial extent of which there is formed radially toward the inside a tubular bushing channel, the wall thickness of which is tapered conically toward at least one of its two ends. An electrical bushing conductor can be fitted into the bushing channel with a form fit and protrude from it on both sides. At at least one of the two axial ends of the bushing channel there is arranged a hollow-cylindrical shielding element of a conductive material, which is thick-walled at least in certain regions, which element can enclose on one side a respective end of the bushing channel, and on another side, electrically contact a connecting conductor.

17 Claims, 2 Drawing Sheets

(56) References Cited

U.S. PATENT DOCUMENTS 8,759,683 B2 * 6/2014 Ko ......................... H01B 17/42
174/650

* cited by examiner

OIL-OIL BUSHING AND OIL TRANSFORMER

RELATED APPLICATION(S)

This application claims priority under 35 U.S.C. §119 to European application 14001129.7, filed in Europe on Mar. 24, 2014, the entire content of which is hereby incorporated by reference in its entirety.

FIELD

An oil-oil bushing is disclosed which can include a rotationally symmetrical, paraboloid-like, hollow bushing element of a solid insulating material, along the axial extent of which there is formed radially toward the inside a tubular bushing channel, the wall thickness of which is tapered conically toward at least one of its two ends, and also can include an electrical bushing conductor fitted into the bushing channel with a form fit and protruding from it on both sides.

BACKGROUND INFORMATION

It is known that high-voltage transformers are used for the transmission of electrical power between different voltage levels in power distribution networks. These transformers have for example for a nominal voltage level of 110 kV/380 kV an output of several 100 MVA. On account of the high voltages, a sufficiently large insulating distance must be maintained in each case between live components, which has the effect on the transformer side in particular that, when air is used as the insulating medium, there is an increase in the overall size. For this reason, transformers of such high voltage levels have been designed as oil transformers, which means that the actual transformer is arranged in an oil-filled tank, the oil serving both as an insulating medium and as a cooling medium. On account of the high insulation resistance of oil in comparison with air, the insulating distances, and consequently the overall size of the transformer, can therefore be advantageously reduced.

At the interfaces at which current-carrying conductors are led out from the insulating medium oil into another insulating medium, such as air, so-called bushings are used, in order thereby to provide the insulating distances required for different insulating media. However, bushings are also used whenever an electrical conductor is led from an enclosed space through a wall into a neighbouring enclosed space that is filled with the same insulating medium. Such an example is also encountered in the case of an oil transformer, that is wherever electrical conductors are led from the oil-filled internal area of an oil tank in which a transformer is arranged into an adjacent internal area of the same oil tank which is separated from the first area and from which for example cable connections are led out. Such bushings are known as oil-oil bushings. The separation of the different internal areas essentially serves for the formation of separate oil reservoirs. In the example mentioned, the side of the bushing that is facing toward the transformer is referred to as the input side and the side that is facing toward the cable space is referred to as the output side.

Oil-oil bushings are based on a standardized element known as a vacuum terminating element. This is a rotationally symmetrical, paraboloid-like, hollow bushing element of a solid insulating material, along the axial extent of which there is formed radially toward the inside a tubular bushing channel, the wall thickness of which is tapered conically toward at least one of its two ends. The form of the bushing element is essentially also comparable to that of a funnel, the funnel outlet being extended rearwardly into the widened region of the funnel. In the installed state, the widened side of the bushing element is facing away from the transformer and facing toward the cable space. The widened side of a bushing element is therefore also referred to as the output side and the side facing away from it is referred to as the input side.

Known oil-oil bushings based on such a standardized vacuum termination are laborious to install, since additional barriers are used on the output side in order to control the field strength occurring during operation in such a way as to be sure of avoiding an electrical breakdown through oil. Similarly, when there are relatively high voltages, an additional insulation is placed on the input side of the oil bushing in order to prevent partial discharges. According to known bushings, a wound paper insulation is used for this, involving a complex manufacturing process. Both the paper insulation and the barriers, which are made of pressboard, have a high risk of moisture absorption, which may lead to an impairment of their function in the oil transformer.

SUMMARY

An oil-oil bushing is disclosed, comprising: a rotationally symmetrical, paraboloid-like, hollow bushing element of a solid insulating material, along an axial extent of which there is formed radially toward an inside a tubular bushing channel, a wall thickness of which is tapered conically toward at least one of its two ends; an electrical bushing conductor fitted into the bushing channel with a form fit and protruding from it on both sides; at at least one of the two axial ends of the bushing channel, a respective hollow-cylindrical shielding element of a conductive material, which is thick-walled at least in certain regions, which element encloses on its one side a respective end of the bushing channel with the bushing conductor protruding from it, and another side of the shielding element being configured for receiving and electrically contacting a respective connecting conductor, axial ends of the shielding element being of a round design; and contacting means provided in the shielding element for its electrical contacting with the protruding bushing conductor or with a received connecting conductor, wherein the contacting means include at least one thread running radially through a wall of the shielding element, and a screw arranged therein for fixing the protruding bushing conductor or a received connecting conductor.

BRIEF DESCRIPTION OF THE DRAWINGS

Exemplary features and advantages are explained in more detail on the basis of exemplary embodiments represented in the drawings, in which.

DETAILED DESCRIPTION

Figure 1:
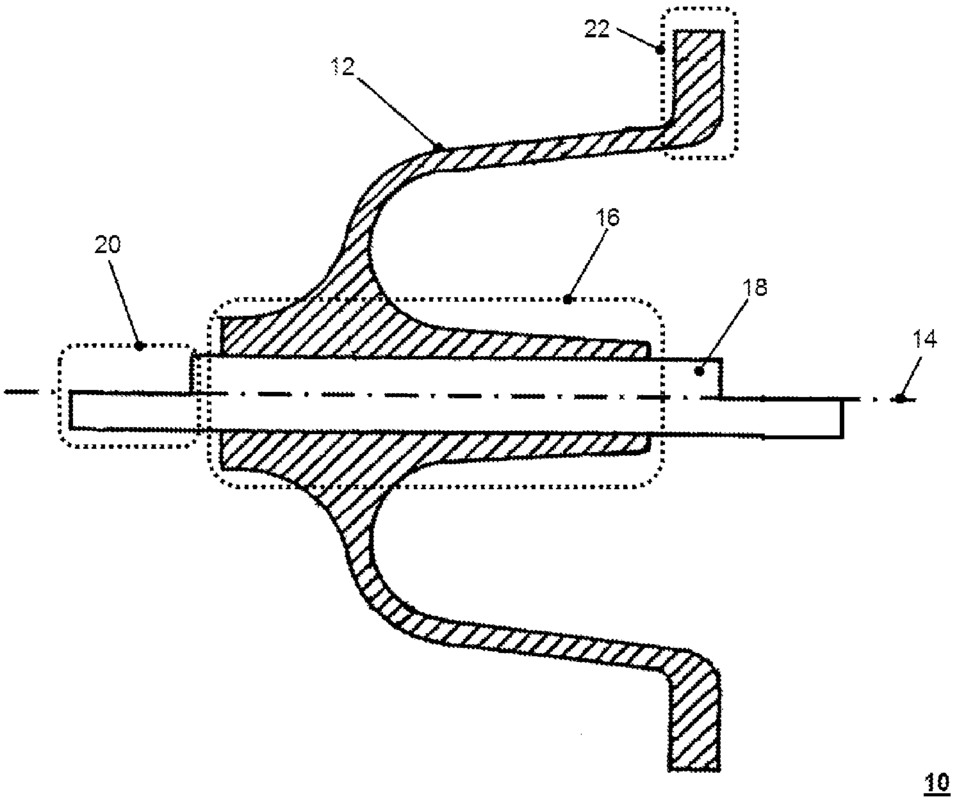
FIG. 1 shows an exemplary bushing element with a bushing conductor.

Exemplary embodiments disclosed herein can dispense with need for a paper insulation or barriers, such as where the bushing is installed on site, because there is no possibility for drying there to counteract this effect.

An exemplary oil-oil bushing disclosed herein can be based on a standardized vacuum termination, can be particularly easy to handle and manage without additional barriers or additional insulating means. A corresponding oil transformer is also disclosed therein.

As disclosed herein, an oil-oil bushing can include an arrangement wherein at least one of the two axial ends of the bushing channel includes a respective hollow-cylindrical shielding element of a conductive material, which is thick-walled at least in certain regions, which element encloses on its one side the respective end of the bushing channel and the bushing conductor protruding from it. Its other side, respectively, is intended for receiving and electrically contacting a respective connecting conductor, the axial ends of the shielding element being of a round design.

Exemplary embodiments provide on both sides at the ends of the bushing channel of a known bushing element a respective dome-like shielding element of an electrically conductive material that influences the potential distribution during the operation of the oil-oil bushing in such a way that no additional barriers and no additional insulating means are required.

In order to achieve a desired shielding effect, one of the measures taken is to provide an axial overlapping of the bushing channel with a respective shielding element. Therefore, the inside diameter of such a hollow-cylindrical shielding element is chosen such that it is in any event greater than the outside diameter of the respective end of the bushing channel tapering conically outward in the axial direction at both its ends. An increased overlapping region is made possible by the conical tapering. Another measure taken is to provide a sufficient axial length of the dome-like shielding elements in order inter alia also by an increased distance from the wall through which the bushing is led to ensure a corresponding distribution of the field strength.

A known vacuum termination or a known rotationally symmetrical, paraboloid-like, hollow bushing element has for example an outside radius of the widened (output) side of about 30 cm, the axial length being about 26 cm. The exemplary inside diameter of the bushing channel is constantly about 4 cm, its axial length being about 22 cm. The length of an exemplary bushing conductor is about 43 cm, resulting in a projection of the bushing conductor of about 10 cm for each side. From the base of the rotationally symmetrical, paraboloid-like hollow bushing element, the bushing channel extends about 14 cm in the axial direction toward the widened (output) side, has an outside diameter there of about 4.5 cm and is axially about 4 cm away from the widened end. In the opposite direction, the bushing channel extends about a further 8 cm to the rear and has at its end there an outside diameter of about 8.2 cm.

The inside diameter of a matching shielding element, which is arranged away from the widened (output) side, is for example about 9 cm, and is consequently about 0.8 cm greater than the corresponding outside diameter of the end there of the bushing channel of about 8.2 cm. As a result, corresponding overlapping is made possible. A corresponding outside diameter of the shielding element, which is for example produced from a metal such as aluminium, is about 15 cm, whereby an exemplary wall thickness of 30 mm is obtained. By making the wall thick in this way, and thereby increasing the outside diameter of such a shielding element, the radially outwardly occurring field strength can be advantageously reduced, the transitional region being designed as uncritical in terms of field strength as a result of the axial overlapping of the bushing channel and the shielding element. For further reduction of the field strength occurring, the axial ends of the hollow-cylindrical shielding element can be of a decidedly round form. A suitable axial length of such a shielding element is for example about 15 cm or more.

The inside diameter of a matching shielding element, which is facing the widened (output) side, is for example about 6 cm, and is consequently about 1.5 cm greater than the corresponding outside diameter of the end there of the bushing channel of about 4.5 cm. A suitable outside diameter of the shielding element is about 12 cm, whereby in turn an exemplary wall thickness of 30 mm is obtained. A suitable axial length of such a shielding element is for example about 20 cm or more. The numerical values mentioned should be regarded as examples within a considerable range of tolerance.

Arranging a corresponding dome-like shielding element on both sides of the bushing channel forms an oil-oil bushing, which can be installed easily without additional barriers or additional insulating means and which is distinguished by its robustness and compactness.

According to an exemplary design of the oil-oil bushing, the shielding element is coated at least on its outer surface with an insulating material, such as with an epoxy resin. As a result, an insulation of the shielding element at conductor potential can be advantageously obtained.

In correspondence with an exemplary design of the oil-oil bushing, the widened open end of the paraboloid-like bushing element goes over into a radially outwardly adjoining terminating region running perpendicularly in relation to the axis of rotation. This advantageously makes it possible to flange-mount the terminating region of the bushing element onto a broken-through wall, through which the oil-oil bushing is to be led.

According to an exemplary variant of the oil-oil bushing, the electrical bushing conductor fitted into the bushing channel has at both of its protruding ends a respective form that is suitable for the form-fitting electrical contacting of a respective connecting conductor with a correspondingly complementary form. Such a form is distinguished an example by an increased contact area between conductors to be connected. A tongue-and-groove form is an example of a suitable form. The conductor ends can be advantageously screwed at their respectively complementary form, in order in this way to ensure a reliable contact.

In an exemplary variant, contacting means are provided in the shielding element for its electrical contacting with the protruding bushing conductor or with a received connecting conductor. This can ensure that the shielding element is certain to have been connected to the electrical potential of the conductor led through. Therefore, an internal potential difference cannot occur and, as a result of the increased radius of the shielding element with respect to the diameter of the conductor, the field strength on the outer surface of the shielding element during operation is correspondingly reduced.

According to an exemplary variant, the contacting means of the shielding element can include at least one annular, and for example resilient, element of an electrically conductive material, the element being intended for enclosing the protruding bushing conductor or a received connecting conductor in a contacting manner. The increased contact area of the annular element in relation to the conductor led through has the effect of ensuring a reliable electrical contact, the annular element also serving for the further contacting of the shielding element.

In an exemplary design of the oil-oil bushing, the contacting means can include at least one thread running radially through the wall of the shielding element and also a screw arranged therein for fixing the protruding bushing conductor or a received connecting conductor. If an annular element is provided, it can likewise be fixed by a screw or a number of screws, and consequently also a conductor led through this element.

By such a screw connection, the shielding element can be fastened from outside in a particularly easy way, whereby its installation can be advantageously simplified, and moreover a compact type of construction is achieved.

According to an exemplary arrangement, at least three threads of a shielding element are arranged in the form of a star, such as in a common plane perpendicular to the axial extent of the conductor to be fixed. This makes particularly secure fixing possible along the entire circumference of the conductor.

According to an exemplary design variant, a shielding element can include respective contacting means both for the protruding bushing conductor and for a received connecting conductor. These means may be for example two groups of three threads each, arranged in the form of a star and having corresponding fixing screws. In this way, the fixing and contacting of the shielding element to the conductors led through is improved further.

According to an exemplary variant of the oil-oil bushing, a shielding element has internal cavities, by which a reduction of its wall thickness in certain portions is brought about. Since the outer form of the shielding element is uninfluenced by this, a saving of material and weight, and consequently also easier handling, are made possible in this way without restricting the functionality.

An oil transformer is also disclosed which can include an oil tank with a first oil-filled internal space area, in which a transformer is arranged, and with a second oil-filled internal space area that is separated from the first area by a wall, the wall having at least one bushing, by means of which an electrical connection of a first electrical connecting conductor in the first internal space to a second electrical connecting conductor in the second internal space is formed, the at least one bushing being an oil-oil bushing as disclosed herein. Exemplary advantages have already been explained with respect to the oil-oil bushing.

FIG. 1 shows an exemplary bushing element 12 with a bushing conductor 18 in a sectional view 10. The bushing element, produced from a solid insulating material, is designed such that it is rotationally symmetrical about an axis of rotation 14, paraboloid-like and hollow. Provided radially midway along the bushing element 12 along its axial extent is a bushing channel 16, which has a constant inside diameter and a wall thickness tapering conically toward both its axial ends. Fitted in the bushing channel with a form fit is a bushing conductor 18, which protrudes from the two ends of the bushing channel 16 and is produced for example from aluminium or copper.

The widened open end of the paraboloid-like bushing element 12 goes over into a radially outwardly adjoining terminating region 22, which runs perpendicularly in relation to the axis of rotation 14 and is intended for flange-mounting the bushing element onto a wall.

The two axial end regions of the bushing conductor have a stepped form 22 for form-fitting contacting, thereby obtaining an increased contact area with a conductor to be connected that has a complementary form.

Figure 2:
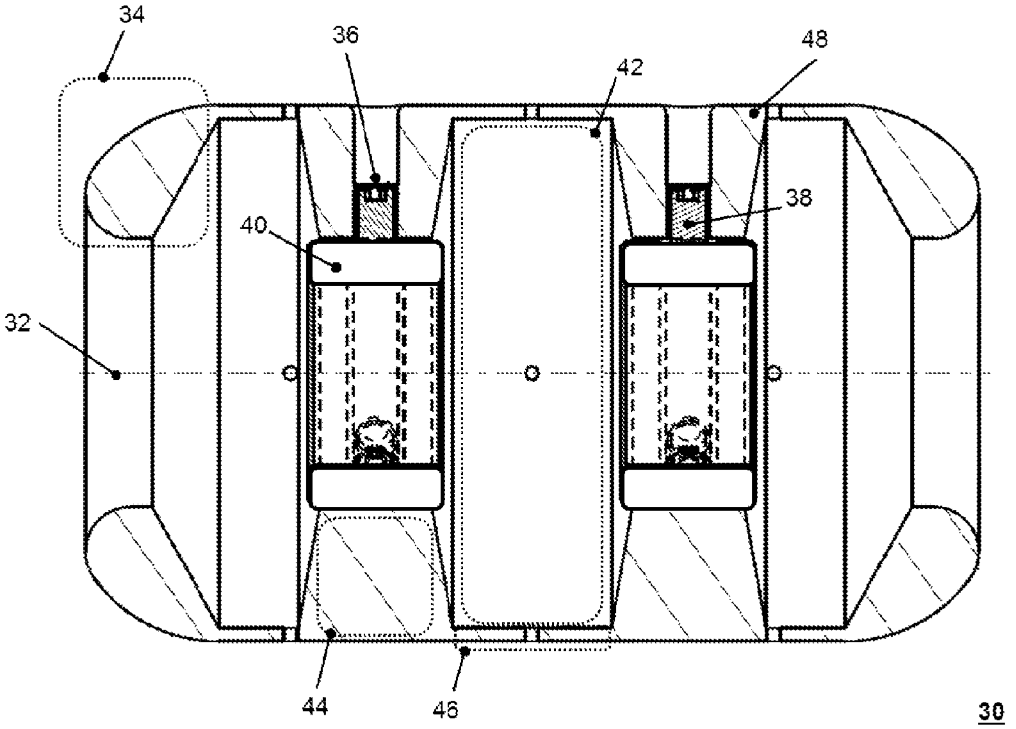
FIG. 2 shows an exemplary first shielding element.

FIG. 2 shows an exemplary first shielding element 30 in a sectional view. This element is intended for being connected to the input side of a bushing element. The basic element 48 is a hollow-cylindrical body of aluminium in this example, which extends along and around an axis of rotation 32. The axial ends 34 of the basic element 48 are of a round design, in order to avoid sharp edges, with a correspondingly increased field strength during operation. Provided along the axial extent of the basic element 48 are three internal cavities 42, which leave the outer form of the basic element 48 unaffected and lead to a weight saving. In the region of the internal cavities 42, the wall thickness is reduced, as indicated by the region depicted by dashed lines with the reference numeral 46, whereas a great wall thickness of for example 3 cm is provided in the other regions, as indicated by the region depicted by dashed lines with the reference numeral 44.

In regions with a great wall thickness 44, radially arranged threads 36 are provided, arranged in which are screws 38. With the screws it is possible to exert a pressure on annular elements 40, within which a conductor that is not shown can be fixed as a result.

Figure 3:
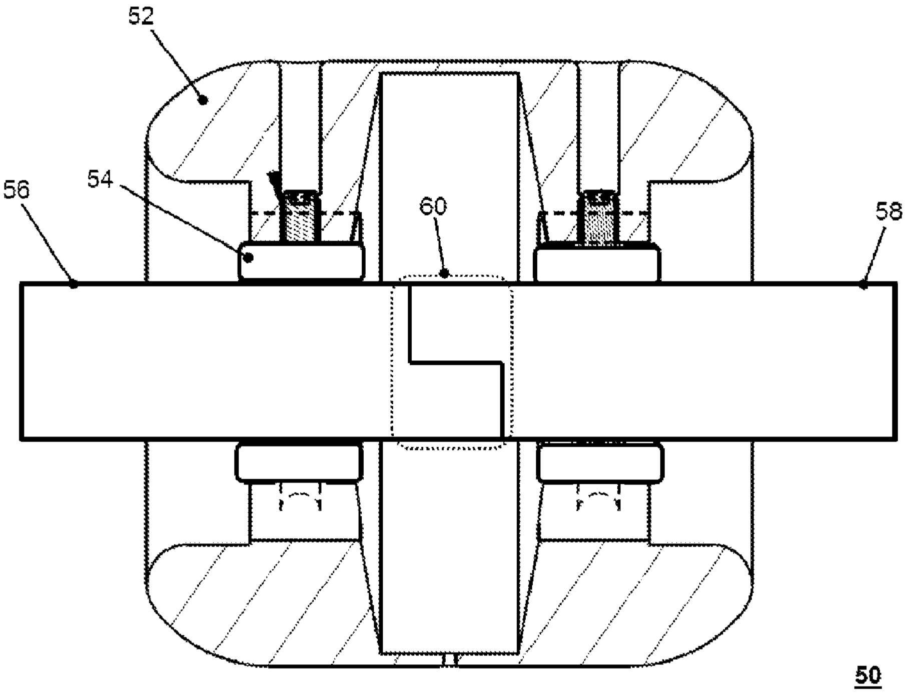
FIG. 3 shows an exemplary second shielding element with electrical conductors.

FIG. 3 shows an exemplary second shielding element 52 with electrical conductors 56, 58 in a sectional view 50. The shielding element 52 is intended for being connected to the output side of a bushing element. The basic element is a hollow-cylindrical body of aluminium in this example. By means of annular elements 54 and using screws, a first conductor 56 and a second conductor 58 are fastened in the interior of the shielding element 52. The conductors 56, 58 have a form that is stepped in a respectively complementary manner of one of their respective ends, so that as a result form-fitting contacting 60 is obtained.

Figure 4:
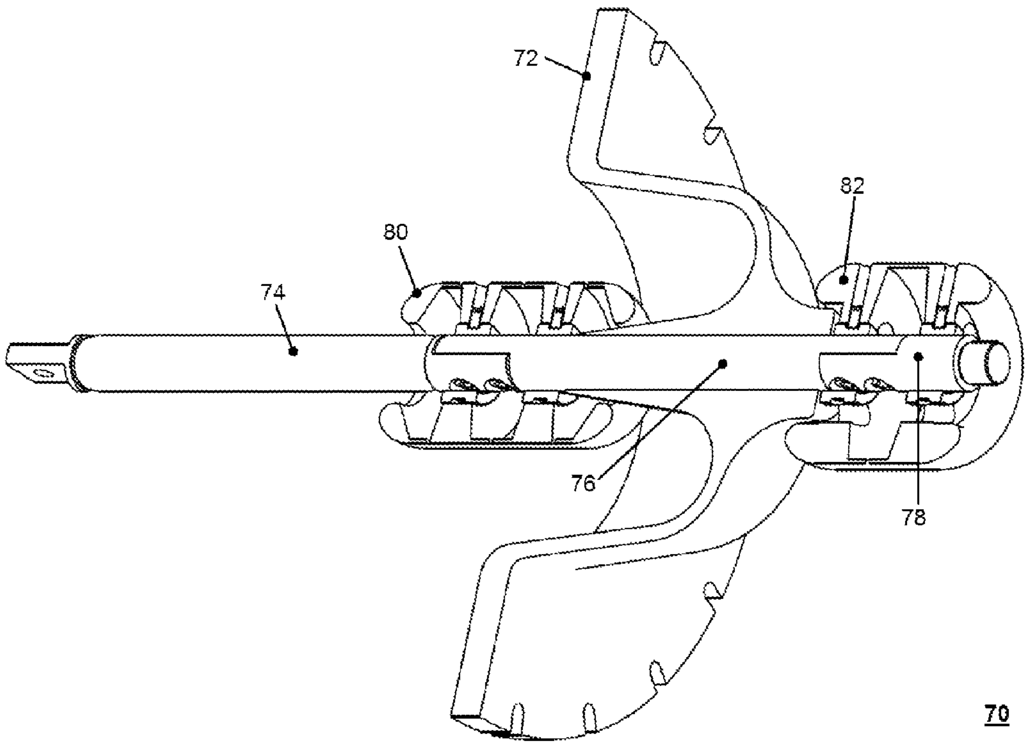
FIG. 4 shows an exemplary oil-oil bushing.

FIG. 4 shows an exemplary oil-oil bushing 70 in a three-dimensional sectional view. A bushing conductor 76 has been fitted into the bushing channel of a bushing element 72. This conductor is connected at its end on the output side to a first connecting conductor 74 and at its end on the input side to a second conducting connector 78. A first shielding element 80 is arranged around the connecting point on the output side, in an overlapping manner with the corresponding one axial end of the bushing channel, and a second shielding element 82 is arranged around the connecting point on the input side, in an overlapping manner with the corresponding other axial end of the bushing channel. The simple and robust construction of the oil-oil bushing assembled in such a way is readily evident.

Thus, it will be appreciated by those skilled in the art that the present invention can be embodied in other specific forms without departing from the spirit or essential characteristics thereof. The presently disclosed exemplary embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

10 exemplary bushing element with bushing conductor
12 bushing element
14 axis of rotation
16 bushing channel
18 bushing conductor
20 form for form-fitting contacting
22 terminating region
30 exemplary first shielding element
32 axis of rotation 34 round design of the axial end of the first shielding element
36 thread
38 screw
40 annular element
42 internal cavity
44 region with great wall thickness
46 region with reduced wall thickness
48 basic body
50 exemplary second shielding element with electrical conductors
52 second shielding element
54 annular element
56 first conductor
58 second conductor
60 form-fitting electrical contacting
70 exemplary oil-oil bushing
72 exemplary bushing element
74 first connecting conductor
76 bushing conductor
78 second connecting conductor
80 first shielding element
82 second shielding element

What is claimed is:

1. An oil-oil bushing, comprising:

a rotationally symmetrical, paraboloid-like, hollow bushing element of a solid insulating material, along an axial extent of which there is formed radially toward an inside a tubular bushing channel, a wall thickness of which is tapered conically toward at least one of its two ends;

an electrical bushing conductor fitted into the bushing channel with a form fit and protruding from it on both sides;

a respective hollow-cylindrical shielding element of a conductive material positioned at one of the two axial ends of the bushing channel, which element is thick-walled at least in certain regions, which element encloses on its one side a respective end of the bushing channel with the bushing conductor protruding from it, and another side of the shielding element being configured for receiving and electrically contacting a respective connecting conductor, axial ends of the shielding element being of a round design; and contacting means provided in the shielding element for its electrical contacting with the protruding bushing conductor or with a received connecting conductor, wherein the contacting means include at least one thread running radially through a wall of the shielding element, and a screw arranged therein for fixing the protruding bushing conductor or a received connecting conductor.

2. The oil-oil bushing according to claim 1, wherein the shielding element is coated at least on its outer surface with an insulating material.

3. The oil-oil bushing according to claim 1, wherein a widened open end of the paraboloid-like bushing element goes over into a radially outwardly adjoining terminating region running perpendicularly in relation to an axis of rotation.

4. The oil-oil bushing according to claim 1, wherein the electrical bushing conductor fitted into the bushing channel has at both of its protruding ends a respective form that is suitable for form-fitting electrical contacting of a respective connecting conductor with a correspondingly complementary form.

5. The oil-oil bushing according to claim 1, wherein the contacting means of the shielding element comprise:

at least one annular element of an electrically conductive material, which is configured for enclosing the protruding bushing conductor or a received connecting conductor in a contacting manner.

6. The oil-oil bushing according to claim 1, wherein at least three threads of a shielding element are arranged in the form of a star.

7. The oil-oil bushing according to claim 1, wherein a shielding element both for the protruding bushing conductor and for a received connecting conductor comprises:

respective contacting means.

8. The oil-oil bushing according to claim 1, wherein a shielding element comprises:

internal cavities for reducing its wall thickness.

9. An oil transformer, comprising:

an oil tank with a first oil-filled internal space area, in which a transformer is arranged; and a second oil-filled internal space area that is separated from the first area by a wall, the wall having at least one bushing, by which an electrical connection of a first electrical connecting conductor in the first internal space to a second electrical connecting conductor in the second internal space is formed, wherein the at least one bushing is an oil-oil bushing according to claim 1.

10. The oil-oil bushing according to claim 1, wherein the shielding element is coated at least on its outer surface with an epoxy resin as an insulating material.

11. The oil-oil bushing according to claim 2, wherein a widened open end of the paraboloid-like bushing element goes over into a radially outwardly adjoining terminating region running perpendicularly in relation to an axis of rotation.

12. The oil-oil bushing according to claim 11, wherein the electrical bushing conductor fitted into the bushing channel has at both of its protruding ends a respective form that is suitable for form-fitting electrical contacting of a respective connecting conductor with a correspondingly complementary form.

13. The oil-oil bushing according to claim 12, wherein the contacting means of the shielding element comprise:

at least one annular element of an electrically conductive material, which is intended for enclosing the protruding bushing conductor or a received connecting conductor in a contacting manner.

14. The oil-oil bushing according to claim 13, wherein at least three threads of a shielding element are arranged in the form of a star.

15. The oil-oil bushing according to claim 14, wherein a shielding element both for the protruding bushing conductor and for a received connecting conductor comprises:

respective contacting means.

16. The oil-oil bushing according to claim 15, wherein a shielding element comprises:

internal cavities for reducing its wall thickness.

17. An oil transformer, comprising:

an oil tank with a first oil-filled internal space area, in which a transformer is arranged; and a second oil-filled internal space area that is separated from the first area by a wall, the wall having at least one bushing, by which an electrical connection of a first electrical connecting conductor in the first internal space to a second electrical connecting conductor in the second internal space is formed, wherein the at least one bushing is an oil-oil bushing according to claim 16.

* * * * *